(12) United States Patent
Zemach et al.

(10) Patent No.: US 7,107,580 B2
(45) Date of Patent: Sep. 12, 2006

(54) BINARY TRANSLATION OF SELF-MODIFYING CODE

(75) Inventors: Yigal Zemach, Rehovot (IL); Alex Skaletsky, Zoran (IL)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 10/338,800

(22) Filed: Jan. 7, 2003

(65) Prior Publication Data
US 2004/0133884 A1 Jul. 8, 2004

(51) Int. Cl.
G06F 9/45 (2006.01)
G06F 9/44 (2006.01)

(52) U.S. Cl. .................. 717/136; 717/137; 717/149
(58) Field of Classification Search ........... 717/131, 717/135–143, 147–151
See application file for complete search history.

(56) References Cited

U.S. PATENT DOCUMENTS

| | | | | |
|---|---|---|---|---|
| 5,507,030 A | * | 4/1996 | Sites | 717/136 |
| 5,560,013 A | * | 9/1996 | Scalzi et al. | 717/138 |
| 5,761,477 A | * | 6/1998 | Wahbe et al. | 718/1 |
| 6,031,992 A | * | 2/2000 | Cmelik et al. | 717/138 |
| 6,397,379 B1 | * | 5/2002 | Yates et al. | 717/140 |
| 6,502,237 B1 | * | 12/2002 | Yates et al. | 717/136 |
| 6,634,023 B1 | * | 10/2003 | Komatsu et al. | 717/159 |
| 6,704,925 B1 | * | 3/2004 | Bugnion | 717/138 |
| 6,732,220 B1 | * | 5/2004 | Babaian et al. | 711/6 |
| 6,820,255 B1 | * | 11/2004 | Babaian et al. | 717/151 |
| 6,941,545 B1 | * | 9/2005 | Reese et al. | 717/130 |
| 6,954,923 B1 | * | 10/2005 | Yates et al. | 717/130 |
| 6,993,751 B1 | * | 1/2006 | Bhansali et al. | 717/137 |
| 7,047,394 B1 | * | 5/2006 | Van Dyke et al. | 712/209 |

OTHER PUBLICATIONS

Wood et al, "An in cache address translation mechanism", IEEE, pp. 358-365, 1986.*
Kupferman et al, "An automatic theoretic approach to barnching time model checking", Jour. of the ACM, vol. 47, No. 2, pp. 312-360, 2000.*
Oi, "On the design of the local varibable cache in a hardware translation based Java Virtual Machine", ACM LCTES, pp. 87-94, 2005.*
Kim et al, "Implementing optimizations at decode time", IEEE, ISCA, pp. 221-232, 2002.*

* cited by examiner

*Primary Examiner*—Anil Khatri
(74) *Attorney, Agent, or Firm*—Fish & Richardson P.C.

(57) ABSTRACT

A simulator includes a binary translator to translate target code into host instructions to be executed on a host processor. To identify target instructions which may be modified by self-modifying code, the simulator determines whether a target instruction to be translated resides in a writeable page, and if so, inserts a run-time check into a translation cache along with translated instructions corresponding to such target instructions.

18 Claims, 5 Drawing Sheets

400 →

405 — Identify addresses of original instruction and translated instruction

410 — Invalidate translated instruction

415 — Translate modified instruction at original instruction address

FIG. 4

BINARY TRANSLATION OF SELF-MODIFYING CODE

BACKGROUND

Simulators may use binary translation to translate a target machine instruction into one or more host machine instructions. These translated instructions may enable the simulated program (after translation) to execute natively, e.g., directly on the host processor. The simulator may invoke the binary translator only for a part of the application actually executed by the processor.

Binary translation may be used to develop an instruction set architecture (ISA) for a new processor, since the ISA of the new processor may be different from the ISA of the host processor on which the simulator runs. Binary translation may also be used to port legacy code from a legacy ISA to a new architecture.

BRIEF DESCRIPTION OF THE DRAWINGS

FIG. 4 is a flowchart describing a correction routine which may be used to handle an SMC event.

DETAILED DESCRIPTION

Figure 1:
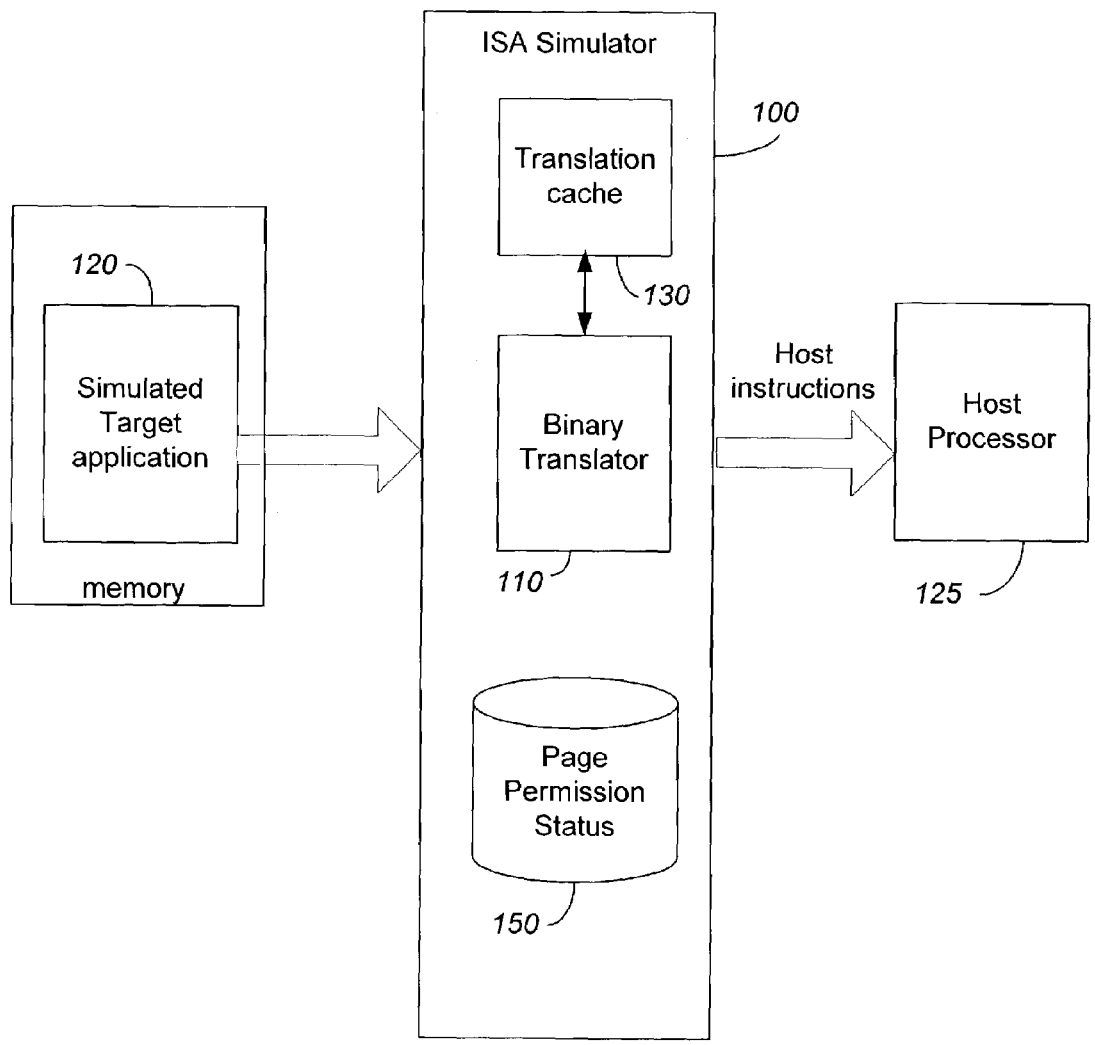
FIG. 1 is block diagram illustrating a simulator including a binary translator.

FIG. 1 illustrates a simulator 100 according to an embodiment. The simulator 100 may be used to simulate instructions of a target instruction set architecture (ISA) on a host machine having a different ISA. The simulator 100 may also be used to be used to port legacy code from a legacy ISA to a new architecture.

The simulator 100 may include a binary translator 110 which may be used to translate a target machine (binary) code into host machine code. A simulator 100 with binary translation may be used to develop a new ISA on an existing processor architecture or, alternatively, to run a legacy ISA on a processor with a new architecture. The target ISA may be, for example, a future extension of IA32, an instruction set, which may be used by the Intel x86 compatible series of microprocessors.

A user may invoke the simulator 100 to execute a simulated target application 120. In an embodiment, the binary translator 110 may simulate an IA32 instruction in the simulated application 120 by decoding the target instruction and translating the target instruction into one or more host instructions. The host instructions may simulate the target instruction when executed on a host processor 125.

For efficiency, the binary translator 110 may translate a sequence of target instructions in one pass and only then execute the translated code. The sequence of target instructions may be organized in blocks. Target machine instructions may be translated one block at a time and then stored as translated code in a translation cache 130. Once translated, a block of translated code may be executed natively on the host processor 125 a number of times.

A computer architecture may permit program instructions to write to an address space allocated for program instructions. This type of code is commonly referred to as "self-modifying code" (SMC). SMC may pose a problem in binary translation because an application including SMC may modify itself at run-time. If a target translation has been translated and stored in the translation cache 130, the translation may become obsolete when the target instruction is modified.

One way to detect an SMC event, e.g., a target instruction modified during run-time, is to intercept every store performed in the system and determine whether the store affects code which has been translated. Alternatively, translation caching may be eliminated and binary translation performed on every target instruction executed. However, these techniques may significantly slow down the simulation. The performance cost associated with such techniques may not be justified since many applications do not contain SMC, and applications which do include SMC may only contain a relatively small amount of SMC.

Figure 2:
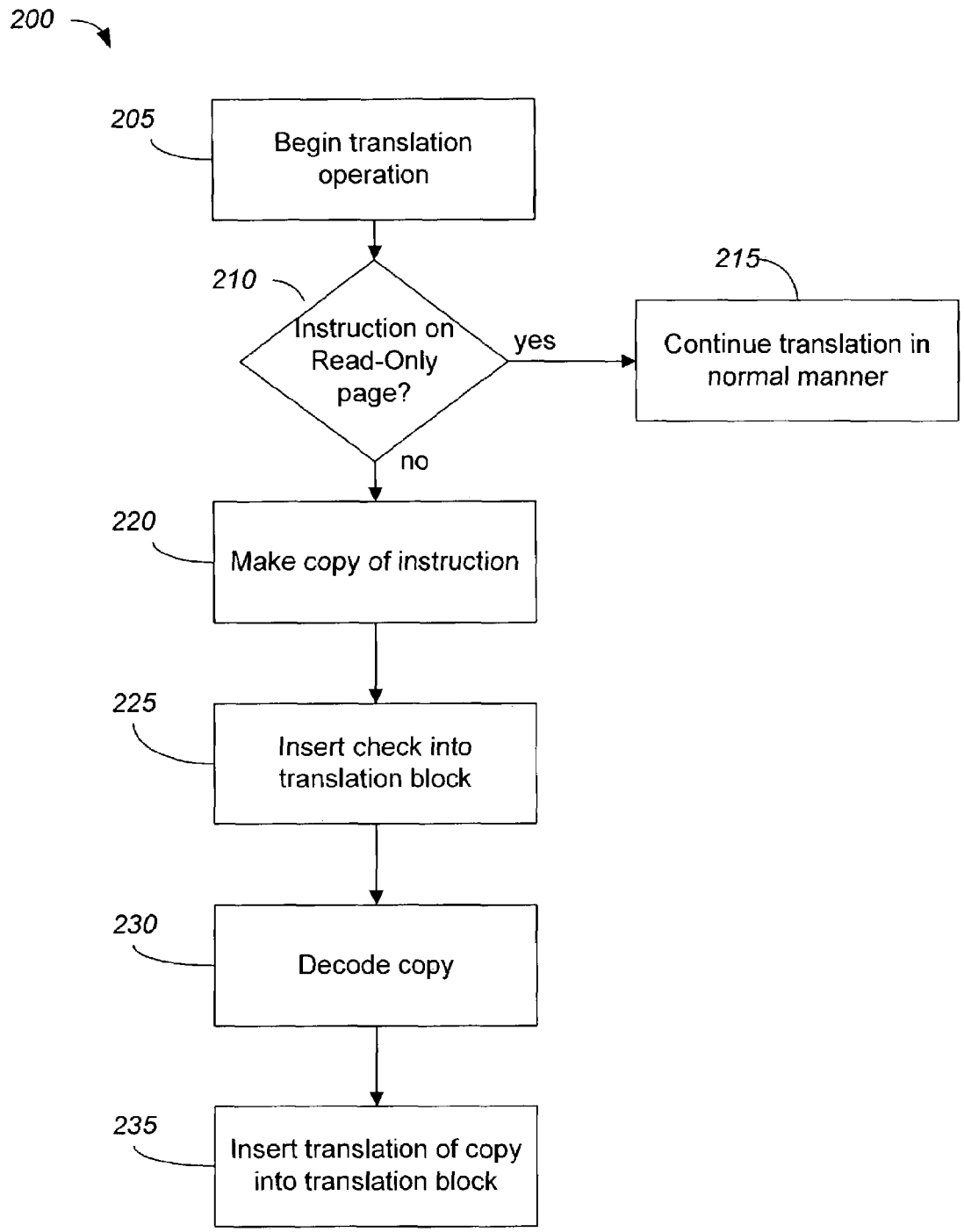
FIG. 2 is a flowchart describing an operation which may be used to detect and handle self-modifying code (SMC) events in binary translation.

FIG. 2 shows a flowchart describing an operation 200 which may be used to detect and handle SMC events in binary translation. Program code may be stored in pages. A page may be a fixed-size block of memory and may serve as a basic unit of memory in the system. A page may have a permission attribute, e.g., writable or read-only. The application may be unable to alter code in a read-only page, but may be able to alter code in a writable page, e.g., in response to an SMC event. The page permission status of pages may be stored in a page permission status database 150.

During translation (block 205), the simulator 100 may determine whether a target instruction in a block is in a read-only page or a writable page (block 210), e.g., by querying the page permission status database 150. If the instruction is in a read-only page, the binary translator 110 may continue normal operation (block 215). If the instruction is in a writable page, the simulator 100 may make a copy of the instruction (block 220). The simulator 100 may insert a run-time check into the translated code block (block 225). The check may include an instruction for the simulator 100 to load the copy and compare the copy to the current value at the target instruction address. As an alternative to the load operation, the copy of the target instruction may be incorporated into the check instruction itself.

The simulator 100 may be operating in a multi-threaded environment. The simulator 100 may acquire a semaphore when the correction routine is invoked in one thread to prevent other threads from accessing the code for the correction routine. The semaphore may provide a mechanism for serializing execution of threads in areas where single threaded execution is important. Multiple threads which try to execute a piece of code protected by a semaphore may be serialized, and allowed to execute through the code section one at a time. In a multi-threaded environment, the simulator 100 may decode the copy (block 230), rather than the original instruction, and insert a translation of the copy into the translated code block (block 235).

Figure 3:
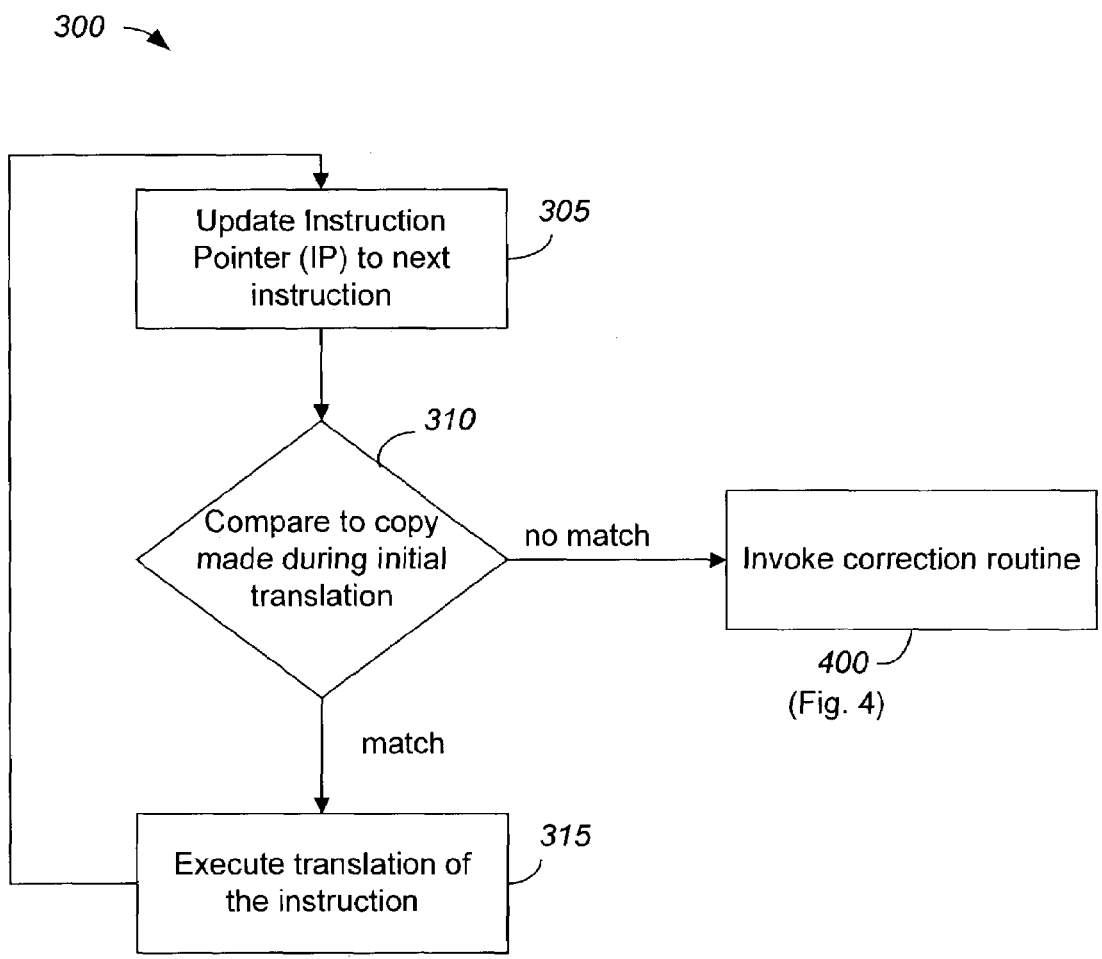
FIG. 3 is a flowchart describing an operation which may be used to perform a run-time check while executing a previously translated instruction.

FIG. 3 shows a flowchart describing an operation 300 which may be used to perform a run-time check while executing a previously translated instruction. While executing instructions in a translated code block, the simulator 100 may update an instruction pointer (IP) to the address of a next instruction in a translated block. The simulator 100 may load the value at the target instruction address. The simulator 100 may then compare the loaded value to the copy made at the initial translation of the instruction (block 310). If the values match, the simulator 100 may execute the translated instructions (block 315) and continue on to the next instruction in the target block. If the values do not match, the simulator 100 may perform a correction routine 400, described by the flowchart shown in FIG. 4.

The simulator 100 may use the IP for the modified instruction to identify the address of the target instruction and the translated instruction (block 405). The simulator 100 may invalidate the translation, e.g., by preventing future branches to that translation (block 410). The simulator 100 may then return to the general translation mechanism to execute the instruction at the target instruction address (block 415). Thus, the instruction at the target instruction address of the modified instruction may be re-translated and stored in the translation cache 130. A new run-time check may be inserted before the translation if the page including the address is determined to be writable. The simulator 100 may then release the semaphore.

The permission of a page may change during execution of a program. The application may make a request to the system for a change in permission of a page by issuing a system call. If the application requests to change the permission of a page containing code from read-only to writable, the code in that page may now be subject to being modified by SMC.

Figure 5:
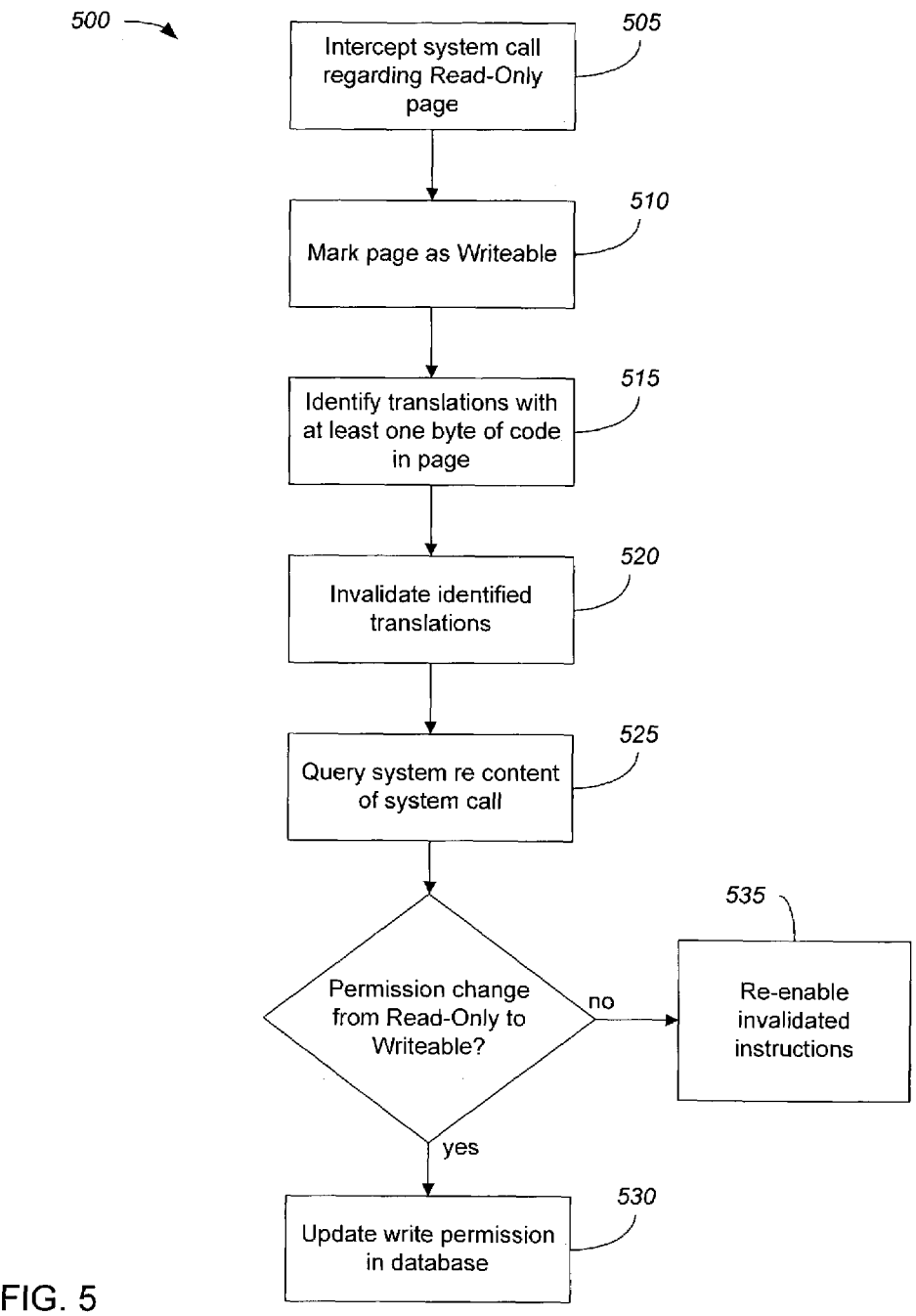
FIG. 5 is a flowchart describing an operation which may be used to handle changes to page permissions.

FIG. 5 shows a flowchart describing an operation 500 which may be used to handle system calls for page permission change requests. The simulator 100 may intercept system calls. When a system call regarding a read-only page is intercepted (block 505), the simulator 100 may identify the page address and mark the page as writable in the page permission status database 150 (block 510), based on a worst-case assumption, e.g., the page permission change request was to change the page permission from read-only to writable. The simulator 100 may query the page permission status database and the translation cache 130 to identify translations with at least one byte of code in the page (block 515). The simulator 100 may invalidate these translations (block 520).

Prior to invalidating the translation, the simulator 100 may suspend other threads to prevent them from using the translation to be invalidated. The simulator 100 may set suspension traps to prevent threads from passing between the translator and the system. Threads not in the system may be considered suspended. For threads accessing critical mechanisms, translating code, or otherwise unable to be suspended, the simulator 100 may wait until such thread may be suspended and then do so.

Once the identified translations are invalidated, the simulator 100 may release the suspension traps and resume the suspended threads. If a thread attempts to execute an instruction with an invalidated translation, it may be required to retranslate the instruction, thereby avoiding errors due to modified code.

The system may make the page permission change after the instructions have been invalidated. The simulator 100 may then query the system to determine the content of the system call (block 525). The simulator 100 may update the database with the new attribute changed by the system call (block 530). If the system call did not change the permission of a read-only page to a write permission, access to the invalidated translations may be re-enabled (block 535).

A number of embodiments have been described. Nevertheless, it will be understood that various modifications may be made without departing from the spirit and scope of the invention. For example, blocks in the various flowcharts may be skipped or performed out of order and still produce desirable results. Accordingly, other embodiments are within the scope of the following claims.

The invention claimed is:

1. A method comprising:
identifying an original instruction having a memory address in a memory block with a write permission;
copying said original instruction to form a copy;
using a processor for translating said copy into one or more translated instructions; and
inserting said one or more translated instructions and a check instruction which allows checking of said translated instruction at run time of the translated instruction into a translation block in a memory.

2. The method of claim 1, further comprising:
executing said check instruction.

3. The method of claim 2, wherein said executing comprises:
loading a current instruction at the memory address;
comparing the current instruction to the copy; and
invalidating said one or more translated instructions.

4. The method of claim 3, further comprising:
translating the current instruction into one or more translated instructions.

5. The method of claim 4, further comprising:
storing the one or more translated instructions translated from the current instruction into the translation block.

6. An apparatus comprising:
a memory operative to store a plurality of permission status indicators corresponding to a plurality of memory blocks;
a translation cache; and
a translator operative to
receive an original instruction having an address in one of said plurality of memory blocks,
identify a permission status of said memory block, and
in response to said memory block having a write permission status, insert a run-time check into the translation cache which allows checking of said translated instruction at run time of the translated instruction.

7. The apparatus of claim 6, wherein the translator is further operative to:
copy the original instruction,
translate the copy into one or more translated instructions, and
insert the one or more translated instructions and a check instruction into the translation cache.

8. The apparatus of claim 7, wherein the translator is further operative to retrieve a current instruction at said memory address in response to executing the check instruction and compare the current instruction to the copy.

9. The apparatus of claim 8, wherein the translator is further operative to invalidate said one or more translated instructions in the translation cache in response to the current instruction not matching the copy.

10. The apparatus of claim 6, wherein the original instruction comprises an instruction in a first instruction set architecture and said one or more translated instructions comprise one or more instructions in a second instruction set architecture.

11. The apparatus of claim 6, wherein the translator comprises a binary translator.

12. The apparatus of claim 6, wherein the plurality of memory blocks comprise a plurality of pages.

13. A system comprising:
a host processor operative to execute host instructions;
a target code memory operative to store target instructions;
a translation cache;
a page permission memory operative to store a plurality of permission status indicators corresponding to a plurality of pages;
a binary translator operative to translate target instructions into host instructions and store said translated instructions in the translation cache; and
a translator operative to
receive a target instruction having an address in one of said plurality of pages,
identify a permission status of said page, and
in response to said page having a write permission status, insert a run-time check into the translation cache which allows checking of said translated instruction at run time of the translated instruction.

14. The system of claim 13, wherein the translator is further operative to
copy the target instruction,
translate the copy into one or more host instructions, and
insert the one or more translated instructions and a check instruction into the translation cache.

15. The system of claim 13, wherein the translator is further operative to
intercept a system call referencing a page having a read-only permission,
identify a target instruction having an address in said page and one or more host instructions corresponding to a translation of said target instruction in the translation cache, and
invalidate said one or more host target instructions.

16. An article comprising a machine-readable medium including machine-executable instructions, the instructions operative to cause a machine to:
identify an original instruction having a memory address in a memory block with a write permission;
copy said original instruction;
translate said copy into one or more translated instructions; and
insert said one or more translated instructions and a check instruction which allows checking of said translated instruction at run time of the translated instruction into a translation block.

17. The article of claim 16, further comprising instructions operative to cause the machine to:
execute said check instruction.

18. The article of claim 17, wherein the instructions operative to cause the machine to execute the check instruction include instructions operative to cause the machine to:
load a current instruction at the memory address;
compare the current instruction to the copy; and
invalidate said one or more translated instructions.

* * * * *